(12) United States Patent
Nanko (10) Patent No.: US 6,923,740 B2
(45) Date of Patent: Aug. 2, 2005

(54) FRONT DERAILLEUR FOR A BICYCLE

(75) Inventor: Yoshiaki Nanko, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/991,880

(22) Filed: Nov. 26, 2001

(65) Prior Publication Data

US 2003/0100393 A1 May 29, 2003

(51) Int. Cl.[7] .................................................. F16H 7/08
(52) U.S. Cl. ............................................ 474/82; 474/78
(58) Field of Search ............................... 479/78, 81, 82

(56) References Cited

U.S. PATENT DOCUMENTS

| | | | | | |
|---|---|---|---|---|---|
| 3,730,012 | A | * | 5/1973 | Juy | 474/82 |
| 4,627,827 | A | * | 12/1986 | Juy | 474/80 |
| 5,620,384 | A | * | 4/1997 | Kojima et al. | 474/82 |
| 5,624,336 | A | * | 4/1997 | Kojima | 474/82 |
| 6,099,425 | A | | 8/2000 | Kondo | |
| 6,234,927 | B1 | | 5/2001 | Peng | |

FOREIGN PATENT DOCUMENTS

EP 538487 A1 * 4/1993 ............ B62M/9/12

* cited by examiner

*Primary Examiner*—David A. Bucci
*Assistant Examiner*—Vicky A. Johnson
(74) *Attorney, Agent, or Firm*—Shinjyu Global IP Counselors, LLP (57) ABSTRACT

A front derailleur includes a fixed member, a chain guide and a linkage assembly. The fixed member has a mounting portion and a pair of mounting flanges axially spaced from each other. The linkage assembly is coupled between the chain guide and the fixed member to transversely move the chain guide. The linkage assembly includes first, second and third links. The first link is pivotally coupled to the fixed member for rotation about a first axis. The second link is pivotally coupled to the mounting flanges for rotation about a second axis. The third link is coupled to the chain guide and movably coupled to the first and second links to form a four-bar linkage together with the fixed member. The mounting flanges preferably have different axial widths. The second link preferably has a longitudinal dimension of least about 45.0 millimeters.

20 Claims, 12 Drawing Sheets

FRONT DERAILLEUR FOR A BICYCLE

BACKGROUND OF THE INVENTION

1. Field of the Invention

This invention generally relates to a front derailleur for a bicycle. More specifically, the present invention relates a front derailleur for a bicycle that has a fixed member with a wide support flange and a wide support link allowing reliable movement of the chain guide.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One part of the bicycle that has been extensively redesigned is the front derailleur. A front derailleur is typically mounted onto the bicycle frame adjacent to the front sprockets.

Generally, a front derailleur includes a fixed member non-movably secured to a bicycle frame, and a movable section supported to be movable relative to the fixed member. Typically, the fixed member is a tubular clamping member that is secured to the seat tube. Alternatively, the fixed member is sometimes coupled to the bottom bracket. In either case, the fixed member preferably has a curved surface designed to contact a curved seat tube portion of the frame. The movable section has a chain guide with a pair of cage plates for contacting and moving a chain between the front sprockets.

The movable section is movable relative to the fixed member by pulling a shift control cable. In particular, the movable section and fixed member usually are interconnected through pivotal links. The control cable is connected to one of the pivotal links to apply a torque thereto, thereby causing the links to move the movable section. The control cable is fixedly coupled to the link in such a position that an operating force is applied to the control cable. This force on the cable is converted into a link swinging torque. Depending on the arrangement and locations of the cable guides, the cable attachment member of the front derailleur may need to be configured differently for different types of frames.

In any case, the linkage assembly of a typical front derailleur is usually constructed of several small plates coupled together. The plates are typically narrow plates located close together to move the chain guide between the various positions. One problem with the typical front derailleur is that the plates experience a variety of forces from the control element (wire), links and chain (resistance). These forces can cause flexing of the links and the chain guide. Thus, smooth shifting can be adversely affected. Additionally, the typical front derailleur can become clogged with mud, dirt or debris. If the derailleur becomes clogged with debris, smooth shifting can again be adversely affected. These prior art derailleurs are often relatively heavy. Moreover, these prior art derailleurs can be complicated and expensive to manufacture and assemble.

In view of the above, there exists a need for a front derailleur for a bicycle, which overcomes the above mentioned problems in the prior art. This invention addresses this need in the prior art as well as other needs, which will become apparent to those skilled in the art from this disclosure.

SUMMARY OF THE INVENTION

One object of the present invention is to provide front derailleur, which provides smooth, reliable shifting of the chain guide even when riding in extreme riding conditions such as through mud, rain, or dirt.

Another object of the present invention is to provide front derailleur that supports the chain guide by a wide link to prevent flexing of the chain guide during shifting.

Another object of the present invention is to provide front derailleur, which is relatively simple and inexpensive to manufacture and assemble.

The foregoing objects can basically be attained by providing a front derailleur comprising a fixed member, a chain guide and a linkage assembly. The fixed member has a mounting portion configured to be coupled to a frame portion of the bicycle, a first mounting flange and a second mounting flange axially spaced from the first mounting flange. The chain guide has a chain receiving slot to shift a chain of the bicycle in a transverse direction. The linkage assembly is coupled between the chain guide and the fixed member to move the chain guide between a retracted position and an extended position. The linkage assembly includes a first link, a second link and a third link. The first link is pivotally coupled to the fixed member at a first pivot point for rotation about a first pivot axis. The second link is pivotally coupled to the first and second mounting flanges for rotation about a second pivot axis passing through the first and second mounting flanges that is substantially parallel to the first pivot axis. The third link is coupled to the chain guide and movably coupled to the first and second links to form a four-bar linkage together with the fixed member. The first and second mounting flanges having different axial widths, as measured along the second pivot axis.

The foregoing objects can also basically be attained by providing a front derailleur comprising a fixed member, a chain guide and a linkage assembly. The fixed member has a mounting portion configured to be coupled to a frame portion of the bicycle, a first mounting flange and a second mounting flange axially spaced from the first mounting flange. The chain guide has a chain receiving slot to shift a chain of the bicycle in a transverse direction. The linkage assembly is coupled between the chain guide and the fixed member to move the chain guide between a retracted position and an extended position. The linkage assembly includes a first link, a second link and a third link. The first link is pivotally coupled to the fixed member at a first pivot point for rotation about a first pivot axis. The second link is pivotally coupled to the first and second mounting flanges for rotation about a second pivot axis passing through the first and second mounting flanges that is substantially parallel to the first pivot axis. The second link has a longitudinal dimension measured along the second pivot axis that is at least about 45.0 millimeters in length. The third link is coupled to the chain guide and movably coupled to the first and second links to form a four-bar linkage together with the fixed member.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
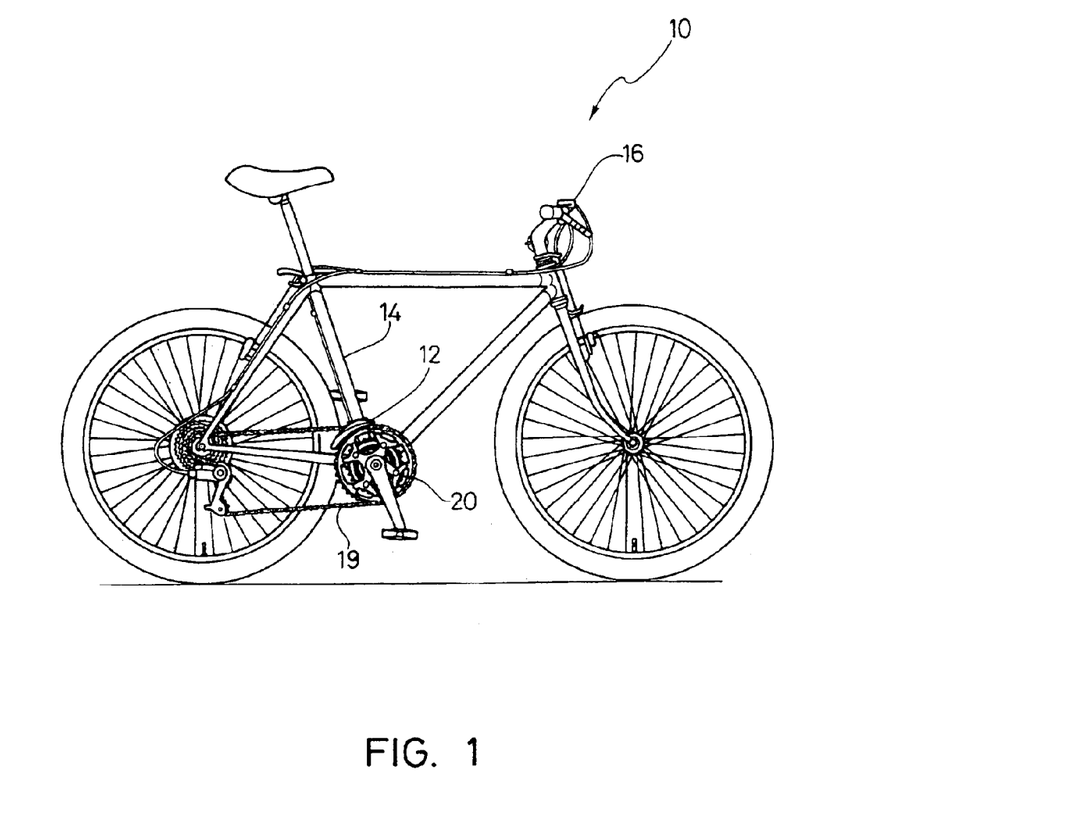
FIG. 1 is a side elevational view of a conventional bicycle with a front derailleur coupled thereto in accordance with a preferred embodiment of the present invention.
Figure 2:
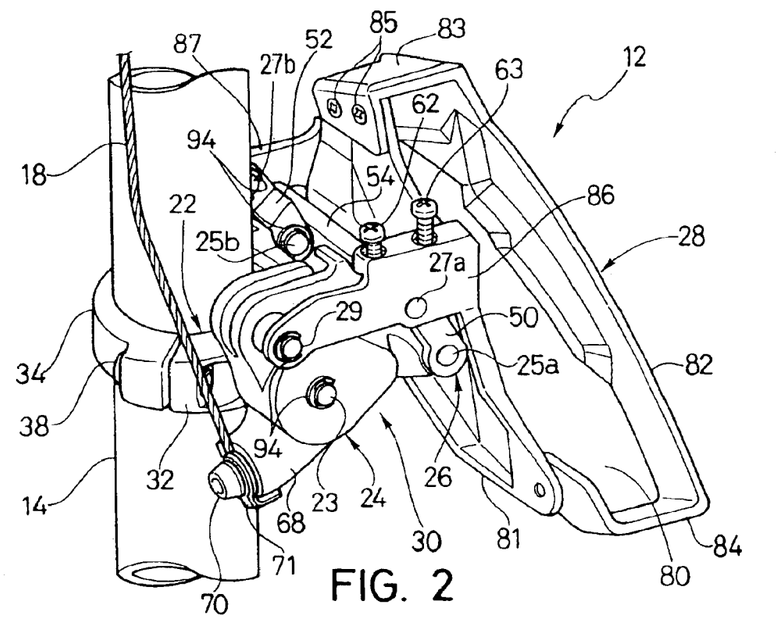
FIG. 2 is an enlarged, reverse perspective view of a portion of the frame of the bicycle illustrated in FIG. 1 with the front derailleur coupled thereto, with a control element (wire) extending upwardly from the front derailleur along the portion of the frame.
Figure 3:
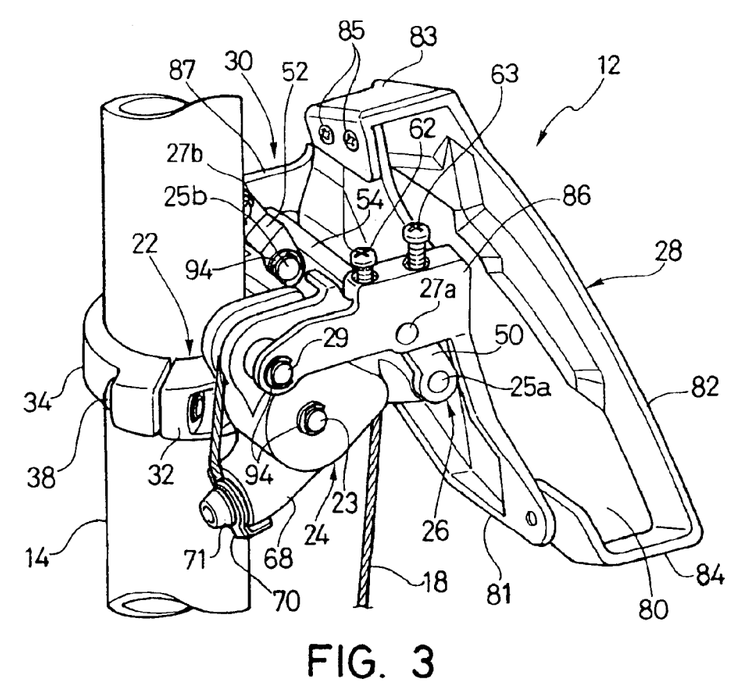
FIG. 3 is an enlarged, reverse perspective view of a portion of the frame of the bicycle illustrated in FIG. 1 with the front derailleur coupled thereto, with a control element (wire) extending downwardly from the front derailleur along the portion of the frame.

Referring initially to FIGS. 1–3, a bicycle 10 is illustrated with a front derailleur 12 fixedly coupled to its seat post portion 14 of its frame, in accordance with a preferred embodiment of the present invention. The front derailleur 12 is operated by a shifting unit 16 via a shift cable 18 to move a chain 19 between front sprockets or chain rings 20.

Referring to FIGS. 1–7, the front derailleur 12 of the present invention basically includes a fixed member 22 (with an axially extending link supporting projection or flange), a cable attachment link 24, a wide support link 26 and a chain guide 28. The fixed member 22 is preferably a tubular clamping member or mechanism. The chain guide 28 is movably supported on the fixed member 22 by the cable attachment link 24 and the support link 26 to move between the various shift positions that correspond to the front sprockets 20. The cable attachment link 24 rotates about an axis A adjacent the center axis of the seat post portion 14 (coinciding with a center axis X of a curved surface of the fixed member 22 in the illustrated embodiment). The center axis X lies substantially in a longitudinal center plane P of the seat post portion 14 (in the illustrated embodiment). Portions of the fixed member 22, the cable attachment link 24, the support link 26 and the chain guide 28 form a linkage assembly 30 that is relatively wide. The location of the rotation axis A of the cable attachment link 24 and the wide configuration of the linkage assembly 30 aid in providing smooth, reliable shifting of the chain 19 between the sprockets 20, as discussed below in more detail.

The front derailleur 12 is designed to accommodate a wide variety of bicycles. In particular, front derailleur 12 can be used with the shift cable 18 coming from above the front derailleur 12 as seen in FIG. 2, or with the shift cable 18 coming from below the front derailleur as seen in FIG. 3. In other words, the cable 18 can be coupled to the cable attachment link 24 of the front derailleur 12 such that its inner wire is either pulled upwardly or downwardly from front derailleur 12 by the shifting unit 16.

Bicycles and their various components are well known in the art, and thus, bicycle 10 and its various components will not be discussed or illustrated in detail herein except for the components that relate to the present invention. In other words, only front derailleur 12 and the components that relate thereto will be discussed and/or illustrated in detail herein.

As used herein, the terms "forward, rearward, upward, above, downward, below and transverse" refer to those directions of a bicycle in its normal riding position, to which the front derailleur 12 is attached. Accordingly, these terms, as utilized to describe the front derailleur 12 in the claims, should be interpreted relative to the bicycle 10 in its normal riding position.

While the front derailleur 12 is illustrated as being fixedly coupled to the seat post portion 14 of the bicycle frame, it will be apparent to those skilled in the art from this disclosure that front derailleur 12 can be coupled to other parts of the bicycle such as the bottom bracket as needed and/or desired. In any event, the fixed portion 22 preferably includes a curved surface configured to contact the seat post portion 14, as discussed in more detail below.

Figure 6A:
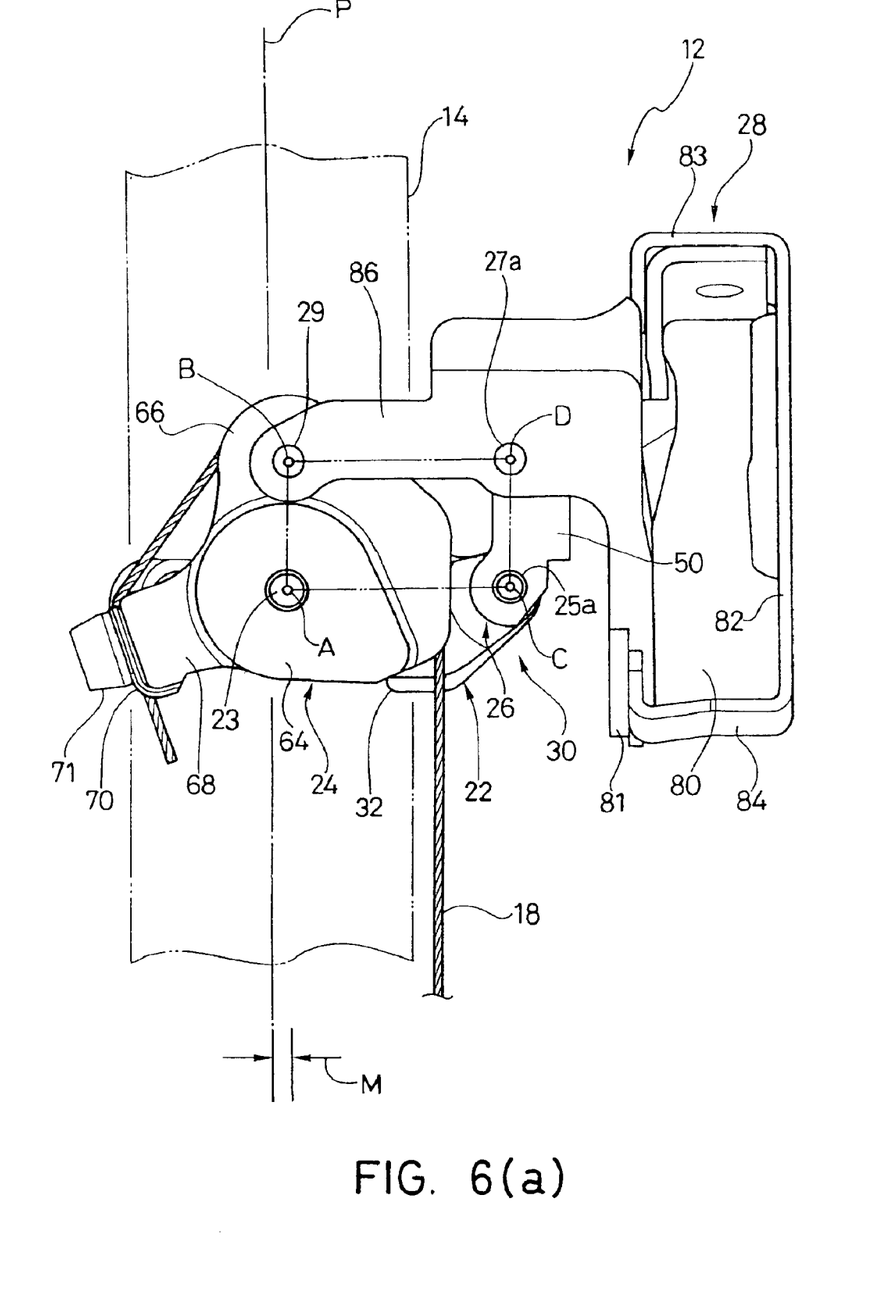
FIG. 6(a) is an enlarged, rear end elevational view of the front derailleur (with the chain guide in the retracted position) illustrated in FIGS. 4 and 5, with the portion of the bicycle frame shown in phantom lines and the four bar linkage diagrammatically illustrated in phantom lines.
Figure 6B:
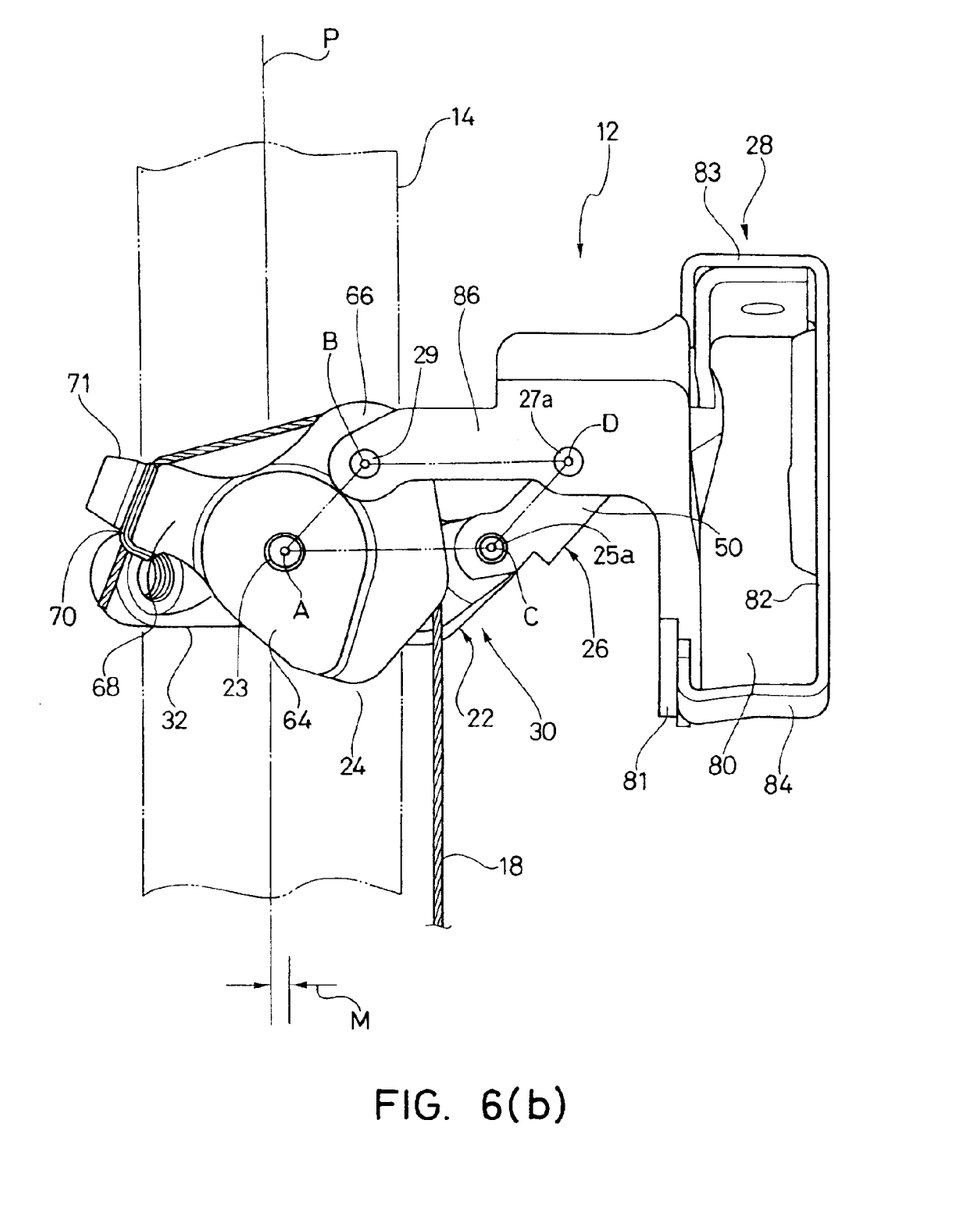
FIG. 6(b) is an enlarged, rear end elevational view of the front derailleur (with the chain guide in the extended position) illustrated in FIGS. 4 and 5, with the portion of the bicycle frame shown in phantom lines and the four bar linkage diagrammatically illustrated in phantom lines.

The linkage assembly 30 is preferably a four bar linkage assembly that is defined by four pivot axes A, B, C and D as best seen in FIGS. 6(a) and 6(b). A portion of the cable attachment link 24 defines a first link between the pivot axes A and B. A portion of the support link 26 defines a second link between the pivot axes C and D. A portion of the chain guide 28 defines a third link between the pivot axes B and D. A portion of the fixed member 22 defines a fourth link between the pivot axes A and C. Thus, the front derailleur 12 basically includes the fixed or tubular clamping member 22, the chain guide 28 and the linkage assembly 30 coupled between the fixed member 22 and the chain guide 28 to form the four-bar linkage.

The cable attachment link 24 is pivotally supported on a pivot pin 23 that is fixedly coupled to the fixed member 22. A pair of pivot pins 25a and 25b that are located on the pivot axis C pivotally support one end of the support link 26 on the fixed member 22. The other end of the support link 26 pivotally supports the chain guide 28 by a pair of pivot pins 27a and 27b that are located on the pivot axis D. A pivot pin 29 located on the pivot axis B is pivotally coupled to the cable attachment link 24 and pivotally supports the chain guide 28. Thus, the chain guide 28 is movably coupled to the cable attachment link 24 and the support link 26 to move between a retracted (low gear) position and an extended (high gear) position, as seen in FIG. 6(a) and 6(b).

As best seen in FIGS. 2, 3, 6(a) and 6(b), the fixed member 22 is preferably located beneath the chain guide 28 (at least below the top portion of the chain guide 28 coupled to the cable attachment link 24 and the support link 26). The linkage assembly 30 is preferably designed such that a biasing member (torsion spring) 31 normally biases the chain guide 28 in a transverse direction towards the frame of bicycle 10. In other words, when the chain guide 28 is closest to the frame of bicycle 10, the chain guide 28 holds the chain 19 over the sprocket 20 that is closest to the seat post portion 14.

When the linkage assembly 30 holds chain guide 28 in its extended position, the chain guide 28 is located over the outermost sprocket 20, i.e., the furthest sprocket 20 from the seat post portion 14. These movements of the chain guide 28 and the linkage assembly 30 are controlled by the shifting unit 16. Specifically, when the rider squeezes the lever of the shifting unit 16, this pulls the shift cable 18 to move the chain guide 28 between its retracted position and its extended position via the linkage assembly 30. The shifting unit 16 is conventional and can be any of a variety of types of shifting units. Therefore, the precise structure of the shifting unit 16 will not be discussed or illustrated in detail herein.

Figure 4:
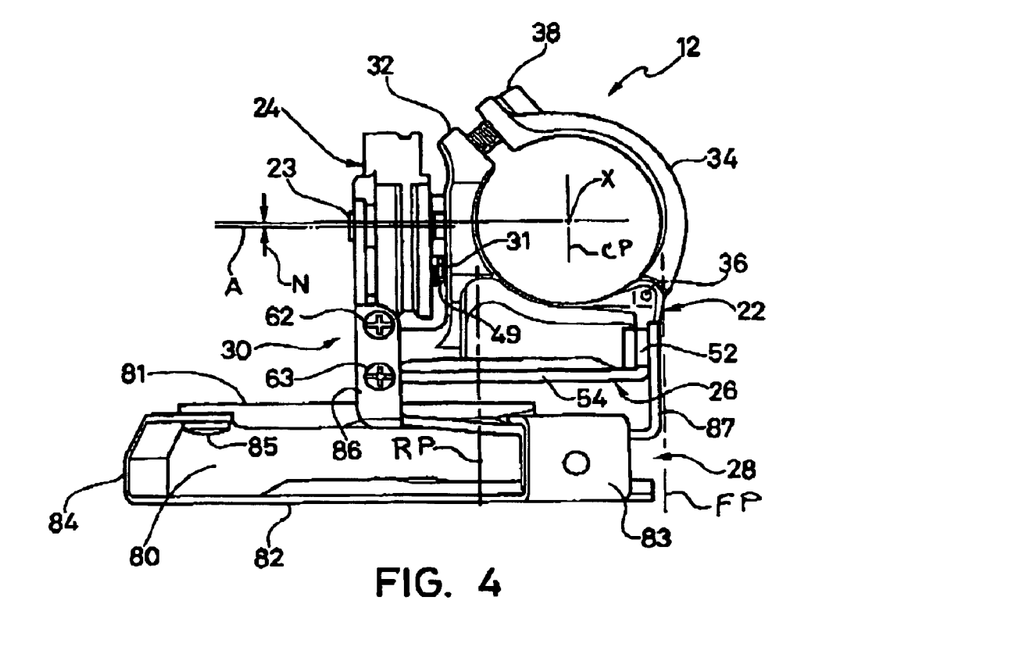
FIG. 4 is a top plan view of the front derailleur illustrated in FIGS. 1–3, with the front derailleur removed from the bicycle frame.
Figure 5:
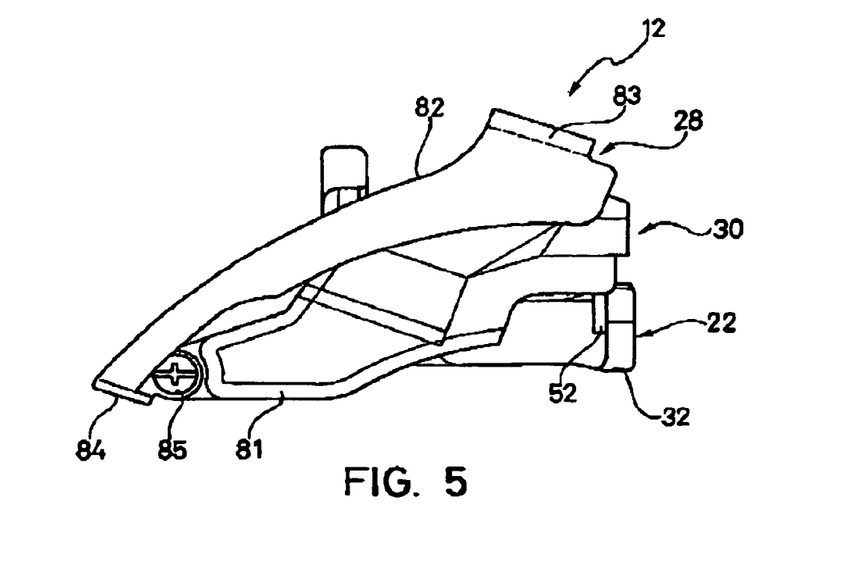
FIG. 5 is an outside elevational view of the front derailleur illustrated in FIG. 4.

As seen in FIGS. 2-11, the fixed member 22 is preferably clamped directly to the seat post portion 14. The fixed member 22 basically includes a first clamping portion 32, a second C-shaped clamping portion 34, a pivot pin 36 and a fastener 38, as best seen in FIG. 4. First and second clamping portions 32 and 34 are constructed of a rigid material to secure the front derailleur 12 to the seat post portion 14 of the bicycle 10. Preferably, clamping portions 32 and 34 are constructed of metal. Of course, clamping portions 32 and 34 could be constructed of other materials such as a hard rigid plastic material. Moreover, each of the clamping portions 32 and 34 could be constructed of a different material. In the illustrated embodiment, the clamping portions 32 and 34 are constructed by utilizing manufacturing techniques such as casting and/or machining. Of course, the clamping portions 32 and 34 can also be constructed of sheet metal that is bent to the desired shape.

First ends of clamping portions 32 and 34 are pivotally coupled together by the pivot pin 36, which extends in a substantially vertical direction relative to the bicycle 10 in a conventional manner. The other ends of clamping portions 32 and 34 are releasably connected together via the fastener 38. The fastener 38 is preferably a screw or bolt that is inserted through an unthreaded hole of the clamping member 34 and threaded into a threaded hole of first clamping portion 32. Of course, the fastener 38 can be utilized in conjunction with a nut, or the like. The structure of the clamping member 34 is relatively conventional. Accordingly, the clamping member 34 will not be discussed and/or illustrated in detail herein.

Of course, it will be apparent to those skilled in the art from this disclosure that front derailleur 12 can be coupled to other parts of the bicycle such as the bottom bracket as needed and/or desired. Moreover, it will be apparent to those skilled in the art from this disclosure that other structures could be utilized to couple the front derailleur 12 to the bicycle 10 without departing from the scope of the present invention. In any event, the fixed member 22 preferably includes a mounting surface (a curved mounting surface in the illustrated embodiment) configured to contact the seat post portion 14, and prevent longitudinal movement of the front derailleur 12. For example, the second clamping portion 34 could be omitted, and the first clamping portion 32 could be coupled to a bottom bracket mounting portion. Thus, the term "fixed member" as used herein means any suitable structure non-movably coupled to the seat post portion 14 and/or the bicycle 10.

Referring to FIGS. 7-11, the first clamping portion 32 includes portions of the linkage assembly 30. In other words, portions of the linkage assembly 30 are integrally formed with the first clamping portion 32. Specifically, the first clamping portion 32 has a pair (first and second) of mounting flanges 40 and 42 that extend outwardly from a C-shaped mounting portion 44 (with a curved mounting surface 45). The mounting portion 44 is pivotally coupled to the second clamping portion 34 via the pivot pin 36 to clamp the fixed member 22 to the seat post portion 14 via the fastener 38.

The mounting flanges 40 and 42 have pivot holes 41 and 43 formed therein, respectively. The pair of pivot pins 25a and 25b are received in the pivot holes 41 and 43, respectively for mounting the support link 26 of the linkage assembly 30 thereto. The first clamping portion 32 also has a threaded pivot hole 46 for fixedly receiving the pivot pin 23 therein. A cutout 47 is preferably provided to reduce weight. The cable attachment link 24 is pivotally mounted on the pivot pin 23 for rotation about the (first) pivot axis A. The pivot axis A is preferably spaced a distance M less than about 5.0 millimeters from the center plane P of the seat post portion 14 (frame portion), measured perpendicular to the (first) pivot axis A, as discussed below in more detail. An additional mounting hole 48 is formed in the first clamping portion 32. A stop pin 49 is fixedly coupled to the first clamping portion 32 within the mounting hole 48 to engage a portion of the biasing member (torsion spring) 31.

The pivot holes 41 and 43 are preferably aligned with each other and have the (second) pivot axis B passing through their centers. Thus, the support link 26 is pivotally coupled to the fixed member 22 for rotation about the pivot axis B. The pivot axis B is preferably substantially parallel to the pivot axis A. The (first and second) mounting flanges 40 and 42 have different axial widths, as measured relative to the pivot axis B. Specifically, the (first) mounting flange 40 has an axial width $L_1$, while the (second) mounting flange 42 has an axial width $L_2$ smaller than the axial width $L_1$. More specifically, the axial width $L_1$ is preferably about 24.8 millimeters, while the axial width $L_2$ is preferably about 3.6 millimeters. In any event, the axial width $L_1$ is preferably at least about five times larger the axial width $L_2$, and the axial width $L_1$ is preferably at least about 21.0 millimeters.

The (first) mounting flange 40 extends axially along the pivot axis B away from the mounting portion 44 of the fixed member 22 to form a first link receiving recess R between the mounting flange 40 and the mounting portion 44. The first link receiving recess R is configured such that cable attachment link 24 is at least partially disposed therein. Thus, the first link receiving recess R is preferably at least partially aligned with the mounting flange 42 in a direction perpendicular to the first and second pivot axes A and B. Therefore, when the front derailleur 12 is assembled, the cable attachment link 24 is preferably at least partially aligned with the (first) mounting flange 40.

The curved mounting surface 45 of the mounting portion 44 preferably has a radius of curvature Y formed about center axis X. The curved mounting surface 45 of the mounting portion 44 and the curved mounting surface of the second clamping member 34 define a seat mounting post area (or simply a mounting area) with a transverse center plane CP being equally spaced and parallel to a transverse front plane FP passing through a forward most edge of the curve mounting surface of the second clamping member 34 and a transverse rear plane RP passing through a rearward most edge of the curved mounting surface of the first clamping member 32, as seen in FIG. 4. Thus, if the seat post portion 14 has substantially the same curvature as mounting surface 45, the center plane P of the seat post portion 14 has the center axis X lying therein (as in the illustrated embodiment). In such an arrangement, the pivot axis A is preferably spaced a distance M of about 2.0 millimeters from the center plane P and a distance N of about 2.0 millimeters from the center axis X, as measured in a direction perpendicular to the pivot axis A.

Of course, it will be apparent to those skilled in the art from this disclosure that the mounting surface 45 could have a larger or smaller curvature if needed and/or desired. It will also be apparent to those skilled in the art from this disclosure that the mounting surface 45 could have other shapes or configurations as needed and/or desired depending on the structure of the frame of the bicycle 10. Finally it will be apparent to those skilled in the art from this disclosure that the pivot axis A could be closer to or farther from the center axis X of the mounting surface 45 (i.e. N could be greater or less than 2.0 millimeters), depending on the configuration of the seat post portion 14.

In any event, the mounting surface 45 is preferably sized and configured such that the center plane P (coinciding with the center of curvature X in the illustrated embodiment) is spaced a distance M less than about 5.0 millimeters from the pivot axis A. Moreover, the pivot axis A is also preferably located relative to center axis X such that pivot axis A is spaced less than about 5.0 millimeters from the center plane P. In other words, in the illustrated embodiment, distances M and N are equal to each other and about 2.0 millimeters. However, it will be apparent to those skilled in the art from this disclosure that distances M and N could be different if needed and/or desired. However, the distance M is preferably less than about 5.0 millimeters.

In the illustrated embodiment, a distance $L_3$ measured between corresponding axially facing end surfaces of the mounting flanges 40 and 42 is preferably about 49.2 millimeters. In any event, distance $L_3$ is preferably at least about 45.0 millimeters. The corresponding axially facing surfaces (spaced $L_3$ from each other) are configured to mount portions of the support link 26 adjacent thereto. Thus, a wide support structure for the support link 26 is provided.

Referring to FIGS. 2–7 and 12–15, the support link 26 basically includes a pair (first and second) of link plates 50 and 52 with a support portion 54 extending between the link plates. The support link 26 is preferably constructed of a hard rigid material. For example, the support link is preferably constructed of metal such as a rigid sheet metal that is bent to the desired shape. When the front derailleur is assembled, the link plates 50 and 52 are substantially vertical plates. The link plate 50 has a first pivot portion 51a and a second pivot portion 51b, while the link plate 52 has a first pivot portion 53a and a second pivot portion 53b.

The first pivot portions 51a and 53a are pivotally coupled to the mounting flanges 40 and 42 via the pivot pins 25a and 25b, respectively. Specifically, the first pivot portions 51a and 53a have holes 55a and 57a formed therein for receiving the pivot pins 25a and 25b, respectively. Thus, the support link 26 is pivotally coupled to the first clamping member 32 (fixed member 22). The second pivot portions 51b and 53b have holes 55b and 57b formed therein for receiving the pivot pins 27a and 27b, respectively, to pivotally support the chain guide 28 via the pivot pins 27a and 27b, as discussed below.

The first pivot portions 51a and 53a have corresponding axially facing surfaces spaced a distance $L_3$ apart from each other. The length $L_3$ is preferably about 49.2 millimeters such that a relatively wide support for the chain guide 28 is provided. In any event, the longitudinal dimension (i.e. $L_3$) of the support link is preferably at least about 45.0 millimeters as measured along pivot axis B. The corresponding axially facing surfaces of first pivot portions 51a and 53a are arranged adjacent the mounting flanges 40 and 42, respectively when the front derailleur 12 is assembled. The first pivot portion 51a is preferably offset from the second pivot portion 51b. The support portion also has a bulged section 56 (i.e. a non-constant cross-section) as seen in FIGS. 12–15 to increase the strength and rigidity of the support link 26.

Figure 14:
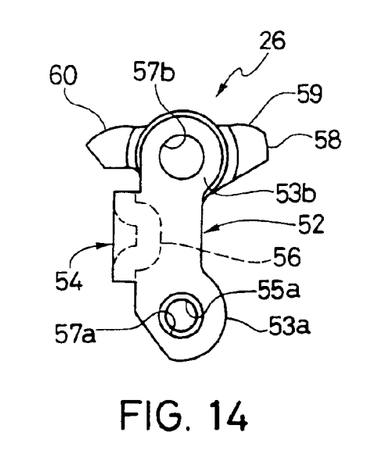
FIG. 14 is a front end elevational view of the support link illustrated in FIGS. 12 and 13.
Figure 15:
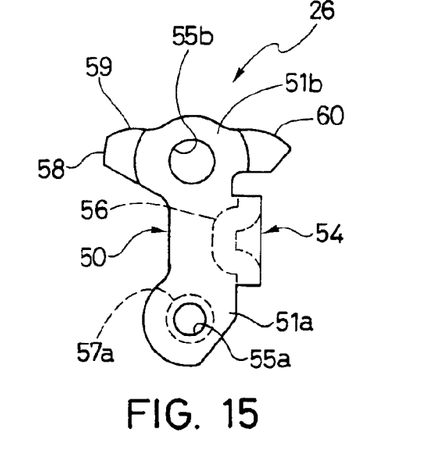
FIG. 15 is a rear end elevational view of the support link illustrated in FIGS. 12–14.
Figure 16:
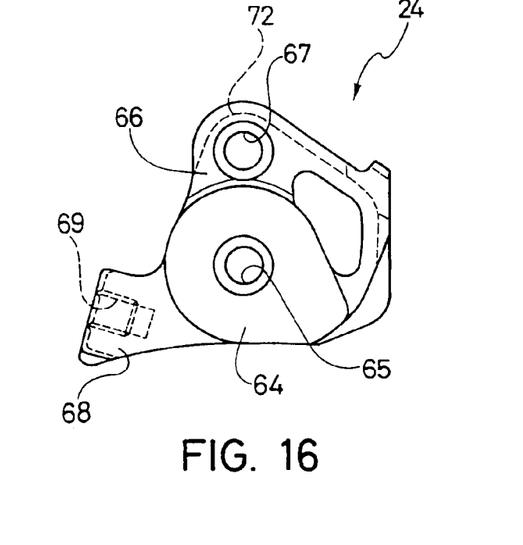
FIG. 16 is an enlarged, rear end elevational view of the cable attachment link (first link) of the front derailleur illustrated in FIGS. 1–7.
Figure 17:
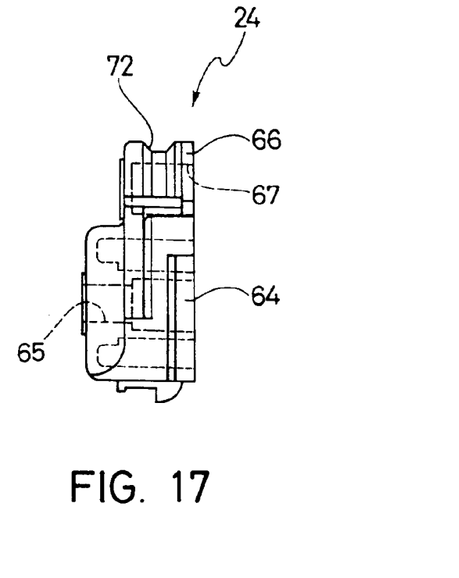
FIG. 17 is an outside elevational view of the cable attachment link illustrated in FIG. 16.

The second pivot portion 51b is provided with a fan-shaped member 58 that engages adjustment screws 62 and 63 for limiting movement of chain guide 28 between its retracted position and its extended position, as seen in FIGS. 2–4. More specifically, the fan member 58 is provided with a high stopping surface 59 and a low stopping surface 60 as best seen in FIGS. 14 and 15. High stopping surface 59 is designed to engage the free end of high adjustment screw 62, while the low stopping surface 60 is positioned to engage the low adjustment screw 63. Since this is a relatively conventional adjustment mechanism that is well known in the prior art, this adjustment mechanism will not be discussed or illustrated in detail herein.

Referring to FIGS. 2–7 and 16–19, the cable attachment link 24 basically includes a mounting portion 64, a link portion 66 and a cable attachment portion 68. The cable attachment link 24 is preferably constructed of a hard, rigid material. For example, the cable attachment link is preferably constructed by utilizing manufacturing techniques such as casting and/or machining. The mounting portion 64 has a pivot hole 65, while the link portion 66 has a pivot hole 67. The pivot hole 67 defines a link attachment portion surrounding the pivot hole 67. The cable attachment portion 68 has a threaded bore 69 for coupling a wire clamp 70 thereto via a fastener 71 (FIGS. 6(a) and 6(b)). The fastener 71 is preferably a screw or bolt, which fixedly secures the wire clamp 70 thereto.

The wire clamp 70 is preferably a substantially L-shaped plate member that fixedly frictionally secures the inner wire of the cable 18 to the cable attachment link 24 when the bolt 71 is tightened against the wire clamp 70. The cable attachment link 24 also preferably has a groove 72 arranged around a portion of it's periphery to guide the inner wire of the cable 18 from wire clamp 70, such that the inner wire of cable 18 extends downwardly from the front derailleur 12 (FIG. 3). Alternatively, the inner wire of the cable 18 is not positioned in the groove 72, such that the inner wire of the cable 18 extends upwardly along the seat post portion 14 (FIG. 2).

Figure 18:
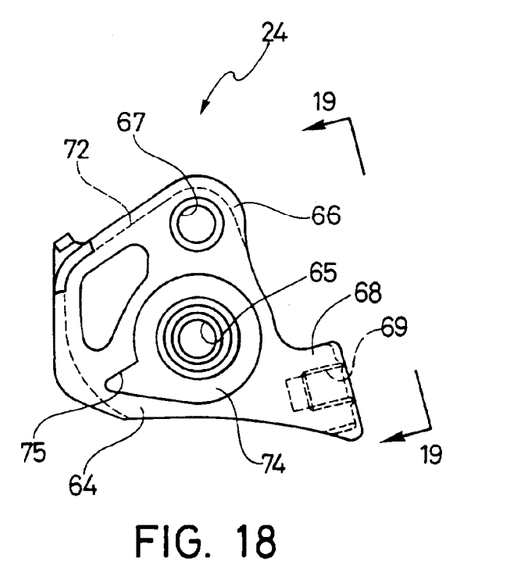
FIG. 18 is a front end elevational view of the cable attachment link illustrated in FIGS. 16 and 17.
Figure 19:
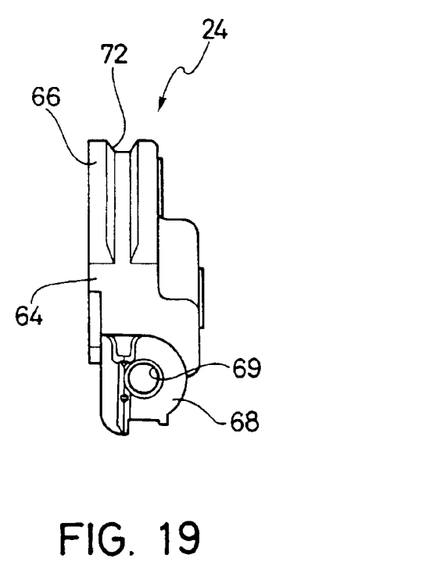
FIG. 19 is an inside elevational view of the cable attachment link illustrated in FIGS. 16–18, as viewed along section line 19—19 of FIG. 18.
Figure 20:
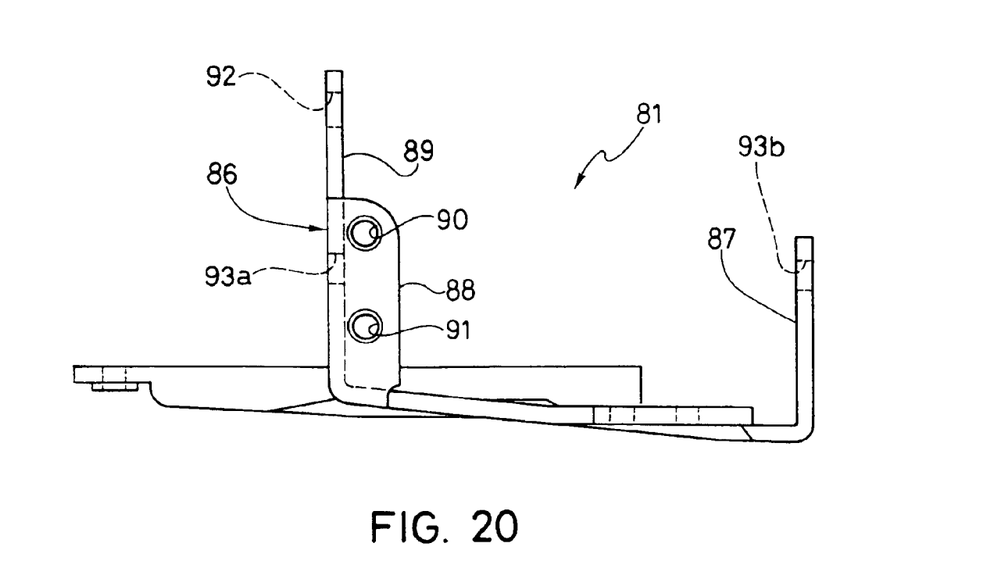
FIG. 20 is an enlarged, top plan view of the inner guide plate (third link) of the chain guide of the front derailleur illustrated in FIGS. 1–7.
Figure 21:
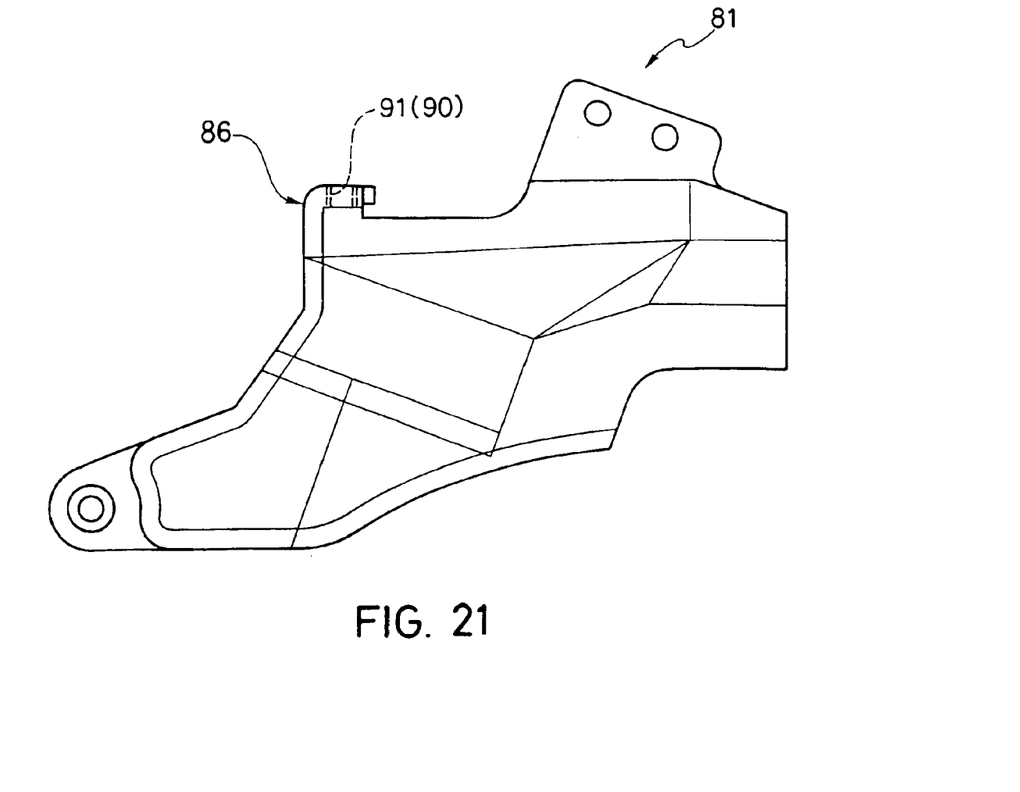
FIG. 21 is an outside elevational view of the inner guide plate illustrated in FIG. 20.
Figure 22:
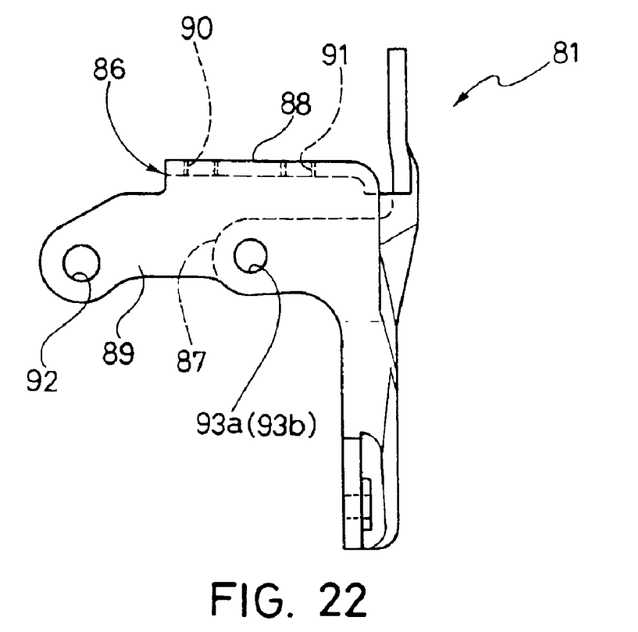
FIG. 22 is a rear end elevational view of the inner guide plate illustrated in FIGS. 20 and 21.
Figure 23:
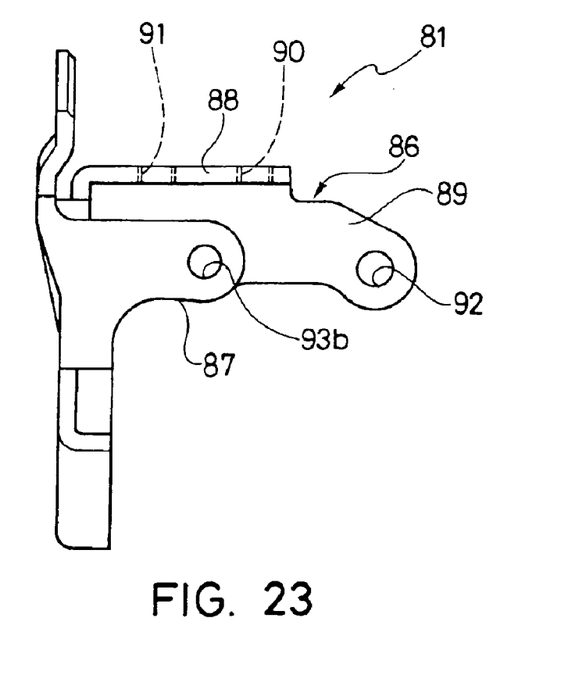
FIG. 23 is a front end elevational view of the inner guide plate illustrated in FIGS. 20–22.

The mounting portion 64 is pivotally coupled on the pivot pin 23 for rotation about the pivot axis A. The link portion 66 pivotally supports the chain guide via the pivot pin 29. When the inner wire of the cable 18 is pulled via the shifting unit 16, the cable attachment link rotates about the pivot axis A. Thus, the link portion 66 also rotates about the pivot axis A, which then moves the chain guide 28 via the pivot pin 29. The mounting portion includes an annular recess 74 with a notch 75 extending therefrom as seen in FIG. 18. The notch 75 is designed to engage an end of the biasing member 31 as discussed below.

As best seen in FIGS. 2–7 and 20–23, the chain guide 28 is preferably constructed of a hard rigid material. For example, the chain guide 28 is preferably constructed of metal such as a rigid sheet metal that is bent to the desired shape. The chain guide 28 has a chain receiving slot 80 formed by a pair of vertical shift plates 81 and 82 that are adapted to engage the chain 19 for moving the chain 19 in a direction transverse to the bicycle 10. The shift plates 81 and 82 (i.e. inner and outer shift plates) are connected together by plates 83 and 84. The plate 83 has one end that is integrally formed with the shift plate 82 and another end that is detachably coupled to the shift plate 81 via screws 85. The shift plate 84 also has one end integrally formed with the shift plate 82 and another end that is detachably coupled to the shift plate 81 via a single screw 85.

The chain guide 28 also has a pair of mounting flanges 86 and 87 extending in a substantially vertical direction from the shift plate 81 for coupling the linkage assembly 30 thereto. A portion of the mounting flange 86 forms one of the links (third link) of the linkage assembly 30. More specifically, the mounting flange 86 has a substantially horizontal section 88 and a substantially vertical section 89. The vertical section 89 preferably has a pair of substantially flat vertical surfaces. The horizontal section 88 has a pair of threaded holes 90 and 91 for receiving the adjustment screws 62 and 63 therein, respectively. The adjustment screw 62 is a high position adjustment screw, while the adjustment screw 63 is a low position adjustment screw. The adjustment screws 62 and 63 selectively engage a portion of linkage assembly 30 (the support link 26) for controlling the range of movement of the chain guide 28 in a conventional manner. In other words, by individually adjusting the axial extension of the adjustment screws 62 and 63 relative to the horizontal section 88, the retracted (low gear) position and the extended (high gear) position of the chain guide 28 are adjusted independently of each other.

The vertical section 89 of the mounting flange 86 has a pair of pivot holes 92 and 93a for pivotally mounting parts of the linkage assembly 30 thereto. The mounting flange 87 also has a pivot hole 93b that is aligned with the pivot hole 93a of the vertical section 89 for pivotally coupling parts of the linkage assembly 30 therebetween. Specifically, the pivot hole 92 pivotally receives the pivot pin 29 (couple to the cable attachment link 24), while pivot holes 93a and 93b pivotally receive the pivot pins 27a and 27b, respectively. Thus, the chain guide 28 is movably coupled to the cable attachment link 24 and the support link 26 via the pivot pin 29 and the pivot pins 27a and 27b, respectively.

Figure 7:
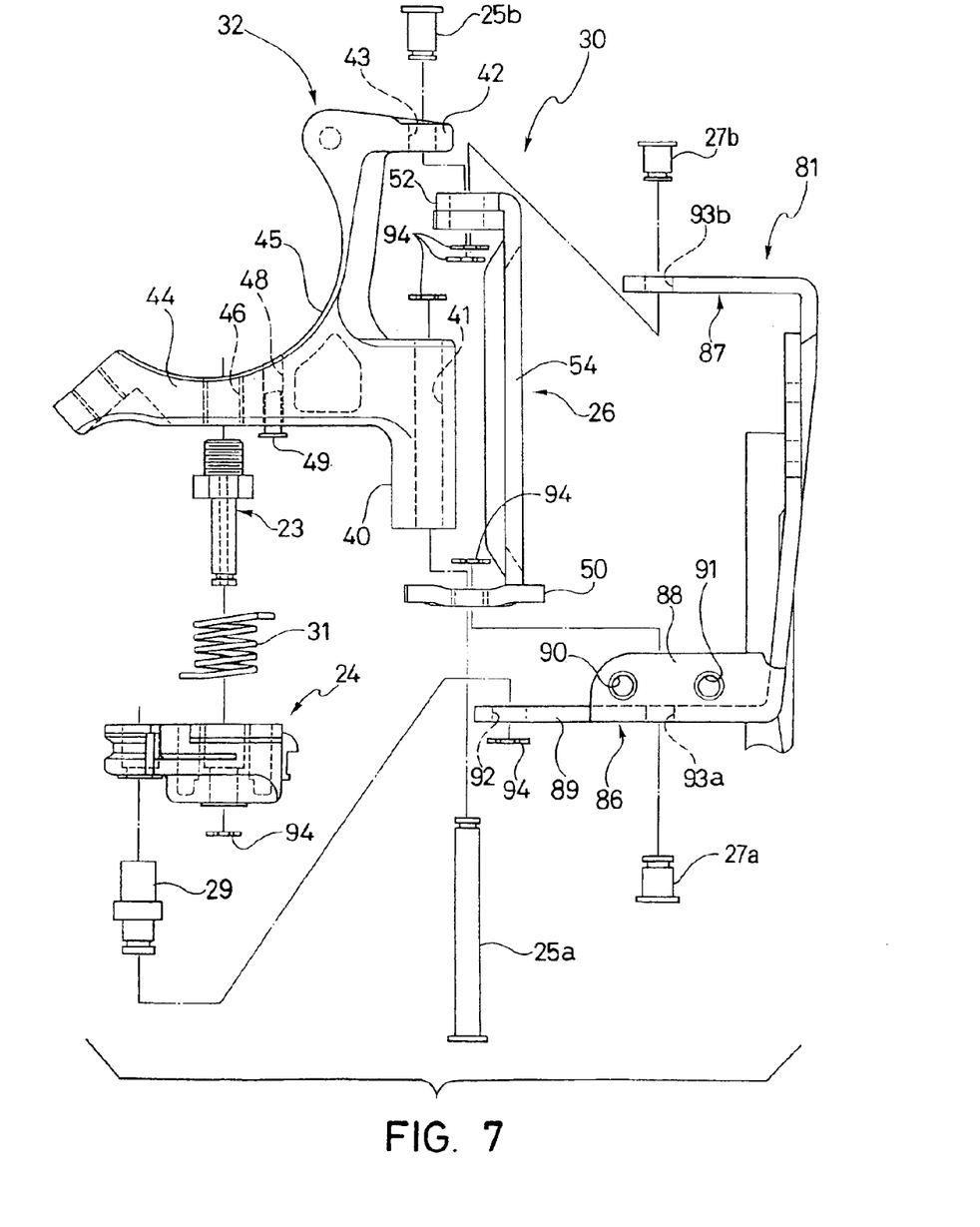
FIG. 7 is a partial, exploded top plan view of the front derailleur illustrated in FIGS. 1–6.
Figure 8:
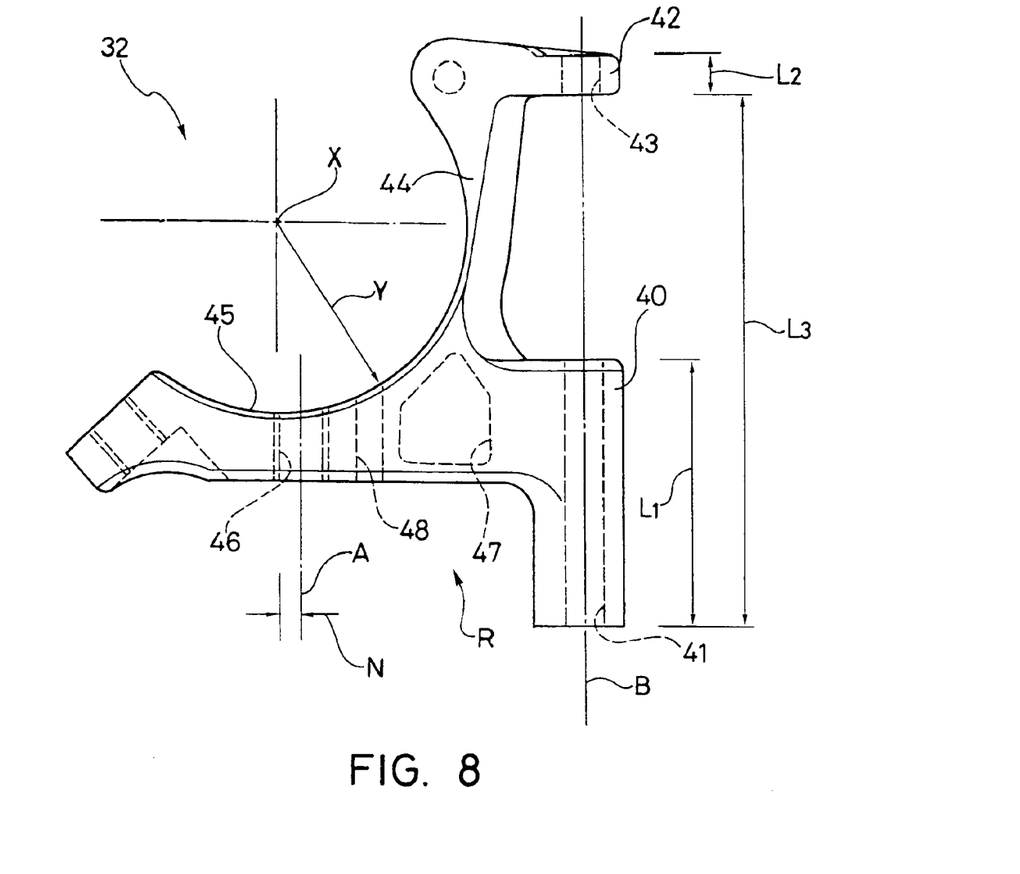
FIG. 8 is an enlarged, top plan view of the first clamping member (i.e. part of the fixed member) of the front derailleur illustrated in FIGS. 1–7.
Figure 9:
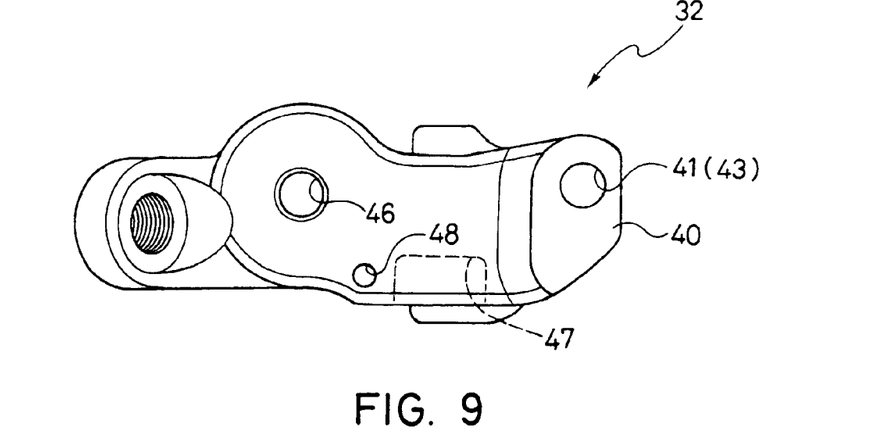
FIG. 9 is a rear end elevational view of the first clamping member (fourth link) illustrated in FIG. 8.
Figure 10:
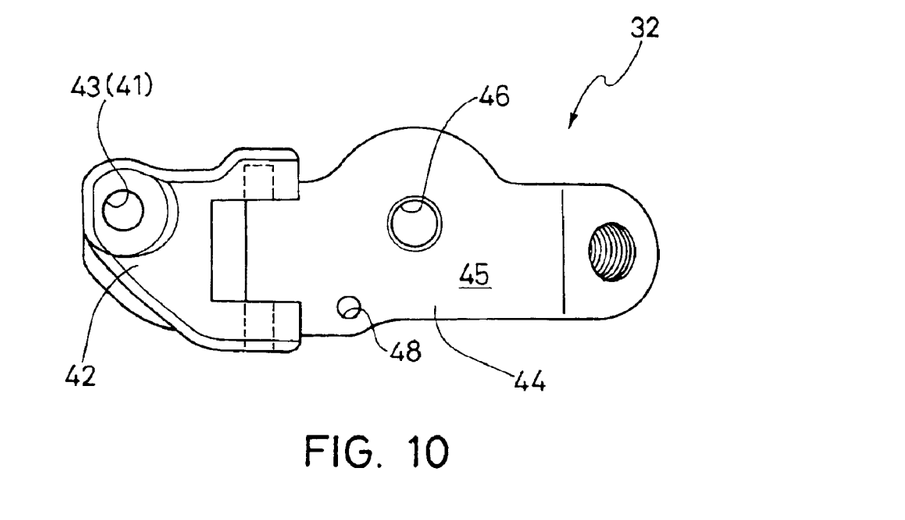
FIG. 10 is a front end elevational view of the first clamping member illustrated in FIGS. 8 and 9.
Figure 11:
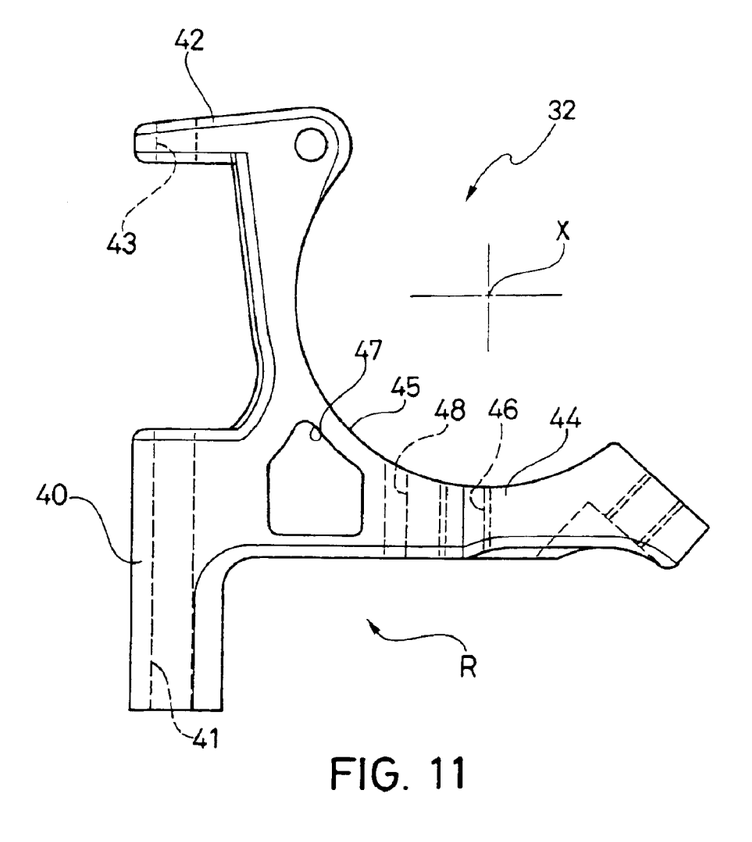
FIG. 11 is a bottom plan view of the first clamping member illustrated in FIGS. 8–10.
Figure 12:
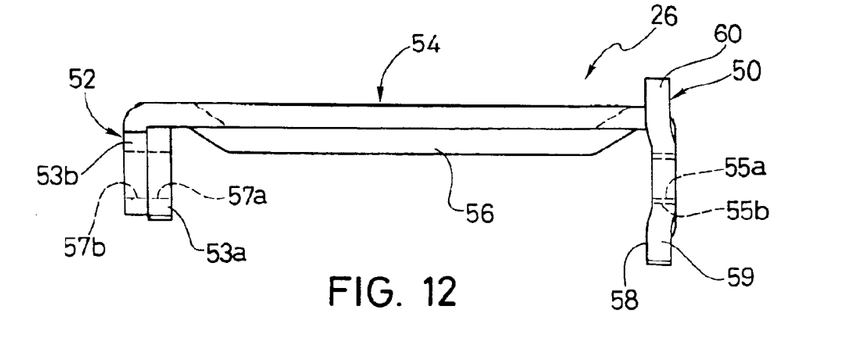
FIG. 12 is an enlarged, top plan view of the support link (second link) of the front derailleur illustrated in FIGS. 1–7.
Figure 13:
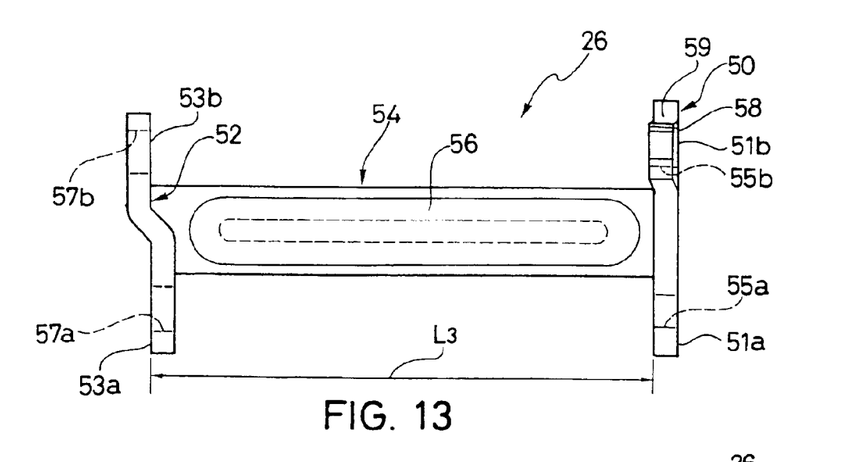
FIG. 13 is an inside side elevational view of the support link illustrated in FIG. 12.

A plurality of snap-on retaining washers 94 are utilized on the pivot pins 23, 25a, 25b, 27a, 27b and 29, as seen in FIGS. 2, 3 and 7. More specifically, each of the pivot pins 23, 25a, 25b, 27a, 27b and 29 has a groove for receiving retaining washers 94. Preferably, these retaining washers 94 are B-shaped retaining clips that are snapped into retaining grooves of the pivot pins. Optionally, the pivot pins 23, 25a, 25b, 27a, 27b and 29 can be utilized with bushings (not shown) mounted in their respective pivot holes. Of course, it will be apparent to those skilled in the art from this disclosure that any suitable pivot pins could be used in conjunction with the present invention. For example, rivet-type pivot pins could be utilized.

The biasing member 31 is preferably a torsion spring having its coiled portion positioned around pivot pin 23. The biasing member 31 has a first end arranged in the notch 75 (FIGS. 7 and 18) of the cable attachment link 24, and a second end engaging the stop pin 49 of the fixed member 22 (FIGS. 4 and 7) for normally biasing the chain guide 28 from its extended position to its retracted position. In other words, the biasing member or torsion spring 31 is normally placed under tension to urge the cable guide 28 from its extended position to its retracted position. Of course, movement of chain guide 28 is controlled by shifting unit 16 moving cable 18 in a relatively conventional manner.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A front derailleur for a bicycle comprising:

a fixed member having a mounting portion configured to be coupled to a frame portion of the bicycle, said fixed member including a first mounting flange, a second mounting flange axially spaced from said first mounting flange and a curved mounting surface having a center axis;

a chain guide having a chain receiving slot to shift a chain of the bicycle in a transverse direction; and a linkage assembly coupled between said chain guide and said fixed member to move said chain guide between a retracted position and an extended position; said linkage assembly including a first link pivotally coupled to said fixed member at a first pivot point for rotation about a first pivot axis, said first link having a cable attachment portion, a second link pivotally coupled to said first and second mounting flanges for rotation about a second pivot axis passing through said first and second mounting flanges that is substantially parallel to said first pivot axis, and a third link coupled to said chain guide and movably coupled to said first and second links to form a four-bar linkage together with said fixed member, said mounting portion being configured and arranged relative to the first and second mounting flanges to define a transverse center plane that is perpendicular to said second pivot axis and passes between the first and second mounting flanges and through the center axis of said curved mounting surface with said first mounting flange being located on a first side of said center plane and said second mounting flange being located on a second side of said center plane that is opposite to said first side of said plane, said center plane being equally spaced and parallel to a transverse front plane passing through a forward most edge of said curved mounting surface and a transverse rear plane passing through a rearward most edge of said curved mounting surface, said front and rear planes defining a mounting area therebetween, said first and second mounting flanges having different axial widths as measured along said second pivot axis with the wider of said first and second mounting flanges being arranged such that a majority of its axial width is located outside said mounting area in an axial direction, said first and second mounting flanges having first and second rear surfaces that are spaced apart by an axial distance larger than an axial space between said front and rear planes.

2. The front derailleur according to claim 1, wherein said axial width of said first mounting flange is at least about five times thicker than said axial width of said second mounting flange with said first mounting flange being at least partially aligned with said first link in a direction perpendicular to said first and second pivot axes.

3. The front derailleur according to claim 1, wherein said second link has a longitudinal dimension measured along said second pivot axis that is at least about 45.0 millimeters in length.

4. The front derailleur according to claim 1, wherein said first mounting flange is at least about 21 millimeters thick, as measured along said second pivot axis.

5. The front derailleur according to claim 1, wherein said linkage assembly includes a biasing member normally urging said chain guide to one of said retracted and extended positions.

6. The front derailleur according to claim 5, wherein said fixed member is a tubular clamping member.

7. A front derailleur for a bicycle comprising:

a fixed member having a mounting portion configured to be coupled to a frame portion of the bicycle, said fixed member including a first mounting flange with a first rearward surface, a second mounting flange with a second rearward surface axially spaced apart from said first mounting flange a first axial distance and a curved mounting surface having a center axis;

a chain guide having a chain receiving slot to shift a chain of the bicycle in a transverse direction, a first support flange extending laterally therefrom and a second support flange extending laterally therefrom that is axially spaced apart from the first support flange a second axial distance that is substantially equal to the first axial distance; and a linkage assembly coupled between said chain guide and said fixed member to move said chain guide between a retracted position and an extended position; said linkage assembly including a first link pivotally coupled to said fixed member at a first pivot point for rotation about a first pivot axis, said fixed member being configured with said first pivot axis being substantially coincident with a center plane of the frame portion that extends substantially parallel to said first pivot axis, said first link being pivotally coupled to one of said first and second support flanges, and a second link pivotally coupled to said first and second mounting flanges for rotation about a second pivot axis passing through said first and second mounting flanges that is substantially parallel to said first pivot axis, and being pivotally coupled to said first and second support flanges, said mounting portion being configured and arranged to define a transverse front plane passing through a forward most edge of said curved mounting surface and a transverse rear plane passing through a rearward most edge of said curved mounting surface, said front and rear planes defining a mounting area therebetween, and said first and second mounting flanges having different axial widths as measured along said second pivot axis with the wider of said first and second mounting flanges being arranged such that a majority of its axial width is located outside said mounting area in an axial direction.

8. The front derailleur according to claim 7, wherein said second link has a longitudinal dimension measured along said second pivot axis that is at least about 45.0 millimeters in length.

9. The front derailleur according to claim 8, wherein said first link has a cable attachment point adapted to fixedly couple a control element thereto.

10. The front derailleur according to claim 9, wherein said linkage assembly includes a biasing member normally urging said chain guide to one of said retracted and extended positions.

11. The front derailleur according to claim 10, wherein said fixed member is a tubular clamping member.

12. The front derailleur according to claim 8, wherein said axial width of said first mounting flange is at least about five times thicker than said axial width of said second mounting flange with said first mounting flange being at least partially aligned with said first link in a direction perpendicular to said first and second pivot axes.

13. The front derailleur according to claim 12, wherein said first mounting flange is at least about 21 millimeters thick, as measured along said second pivot axis.

14. The front derailleur according to claim 7, wherein said fixed member is configured with said first pivot axis being spaced less than about 5.0 millimeters from the center plane of the frame portion, measured perpendicular to said first pivot axis.

15. The front derailleur according to claim 7, wherein said first link has a cable attachment point adapted to fixedly couple a control element thereto.

16. A front derailleur for a bicycle comprising:

a fixed member having a mounting portion configured to be coupled to a frame portion of the bicycle, said fixed member including a first mounting flange and a second mounting flange axially spaced from said first mounting flange;

a chain guide having a chain receiving slot to shift a chain of the bicycle in a transverse direction; and a linkage assembly coupled between said chain guide and said fixed member to move said chain guide between a refracted position and an extended position; said linkage assembly including a first link pivotally coupled to said fixed member at a first pivot point for rotation about a first pivot axis, said first link having a cable attachment portion, a second link pivotally coupled to said first and second mounting flanges for rotation about a second pivot axis passing through said first and second mounting flanges that is substantially parallel to said first pivot axis, said first pivot axis being spaced farther from a center longitudinal plane of said chain receiving slot of said chain guide than said second pivot axis as measured in a direction perpendicular to the center longitudinal plane of said chain receiving slot, and a third link coupled to said chain guide and movably coupled to said first and second links to form a four-bar linkage together with said fixed member, said first and second mounting flanges having different axial widths, as measured along said second pivot axis, said first mounting flange extending axially along said second pivot axis away from said mounting portion of said fixed member to form a first link receiving recess between said first mounting flange and said mounting portion of said fixed member such that said first link is at least partially disposed in said first link receiving recess to be at least partially aligned with said first mounting flange in a direction perpendicular to said first and second pivot axes.

17. The front derailleur according to claim 16, wherein said first link includes a link attachment portion that is axially disposed between said third link and said fixed member, relative to said first pivot axis.

18. The front derailleur according to claim 16, wherein said axial width of said first mounting flange is at least about five times thicker than said axial width of said second mounting flange with said first mounting flange being at least partially aligned with said first link in a direction perpendicular to said first and second pivot axes.

19. A front derailleur for a bicycle comprising:

a fixed member having a mounting portion configured to be coupled to a frame portion of the bicycle, said fixed member including a first mounting flange, a second mounting flange axially spaced from said first mounting flange and a curved mounting surface having a center axis;

a chain guide having a chain receiving slot to shift a chain of the bicycle in a transverse direction; and a linkage assembly coupled between said chain guide and said fixed member to move said chain guide between a retracted position and an extended position; said linkage assembly including a first link pivotally coupled to said fixed member at a first pivot point for rotation about a first pivot axis, said first link having a cable attachment portion, a second link pivotally coupled to said first and second mounting flanges for rotation about a second pivot axis passing through said first and second mounting flanges that is substantially parallel to said first pivot axis, and a third link coupled to said chain guide and movably coupled to said first and second links to form a four-bar linkage together with said fixed member, said mounting portion being configured and arranged relative to the first and second mounting flanges to define a plane that is perpendicular to said second pivot axis and passes between the first and second mounting flanges and through the center axis of said curved mounting surface with said first mounting flange being located on a first side of said plane and said second mounting flange being located on a second side of said plane that is opposite to said first side of said plane, said first and second mounting flanges having different axial widths, as measured along said second pivot axis, said first mounting flange extending axially along said second pivot axis away from said mounting portion of said fixed member to form a first link receiving recess between said first mounting flange and said mounting portion of said fixed member such that said first link is at least partially disposed in said first link receiving recess to be at least partially aligned with said first mounting flange in a direction perpendicular to said first and second pivot axes.

20. The front derailleur according to claim 19, wherein said first link includes a link attachment portion that is axially disposed between said third link and said fixed member, relative to said first pivot axis.

\* \* \* \* \*